United States Patent [19]

Lenhardt

[11] Patent Number: 4,538,248

[45] Date of Patent: Aug. 27, 1985

[54] RECORDING SYSTEM FOR A BOREHOLE LOGGING TOOL

[75] Inventor: Wilfred K. Lenhardt, Richardson, Tex.

[73] Assignee: Mobil Oil Corporation, New York, N.Y.

[21] Appl. No.: 364,364

[22] Filed: Apr. 1, 1982

[51] Int. Cl.³ .......................... G01V 1/40; G01V 3/18; G01V 5/04

[52] U.S. Cl. .......................................... 367/25; 73/151; 181/102; 324/323; 346/33 WL

[58] Field of Search ..................... 367/33, 68, 69, 27, 367/25; 346/33 WL, 1.1; 340/860; 324/323; 73/151; 181/102

[56] References Cited

U.S. PATENT DOCUMENTS

| | | | |
|---|---|---|---|
| 3,185,994 | 5/1965 | Woods et al. | 367/74 |
| 3,356,990 | 12/1967 | Sloughter | 346/33 |
| 3,488,661 | 1/1970 | Tanguy | 346/33 |
| 3,490,150 | 1/1970 | Witfill, Jr. | 367/33 |
| 3,845,492 | 10/1974 | Tejada | 346/33 WL |
| 4,297,879 | 11/1981 | Howells et al. | 340/860 |

Primary Examiner—Salvatore Cangialosi
Assistant Examiner—K. R. Kaiser
Attorney, Agent, or Firm—Alexander J. McKillop; Michael G. Gilman; Charles J. Speciale

[57] ABSTRACT

A borehole logging system includes a borehole logging tool, a logging tool depth encoder for indicating rate of movement of the logging tool, a moving recording medium, and a recording encoder for indicating the actual rate of movement of the recording medium. The logging rate indicated by the depth encoder is used to provide a signal representative of a desired recording rate. This desired recording rate is compared to the actual recording rate and correction made to the recording rate when there is a variance between such desired and actual recording rates.

4 Claims, 3 Drawing Figures

RECORDING SYSTEM FOR A BOREHOLE LOGGING TOOL

BACKGROUND OF THE INVENTION

This invention relates to a recording system for use with an acoustic velocity logging tool.

In the exploration for petroleum and other minerals, well logging techniques are employed to determine the character of subsurface formations penetrated by a borehole. One technique of logging these characteristics employs a logging tool including a transmitter of acoustic pulses and a receiver, or receivers, for detecting these acoustic pulses after they have traversed the subsurface formations adjacent the tool. By measuring the traveltime of acoustic energy from the transmitter through the formation to the receiver, an indication of the velocity of acoustic energy through the subsurface formation is obtained and this acoustic velocity is an indication of the character of the subsurface formation. By recording the acoustic velocity in correlation with the depth of borehole as the tool moves through the borehole, there is obtained a log of the characteristics of the subsurface formations as a function of depth. Such logs are quite useful, particularly in the exploration for oil-bearing subsurface strata.

In U.S. Pat. No. 3,302,166 to Joseph Zemanek, Jr., there is disclosed an acoustic velocity logging system wherein a downhole tool comprises a plurality of transducers including a transmitter and multiple receivers. The receivers are spaced at different distances from the transmitter such that an acoustic pulse from the transmitter arrives at the receivers by way of different travel paths through the formation surrounding the borehole. Upon generation of an acoustic pulse by the transmitter, a transmitter trigger pulse is transmitted uphole by way of a conductor in the logging cable. The signals produced by the receivers in response to the arrival of the acoustic pulse at the receivers are also transmitted uphole by way of conductors within the logging cable. The logging system is provided with downhole gating circuits which permit the first acoustic pulse to be detected and sent uphole by a first receiver, the second acoustic pulse to be detected and sent uphole by a second receiver, the third acoustic pulse to be detected and sent uphole by a third receiver, and the fourth acoustic pulse to be detected and sent uphole by a fourth receiver. The cycle is then repeated with successive acoustic pulses being detected and transmitted uphole by successive ones of the receivers. The time interval between the generation of each acoustic pulse and the detection of that pulse at a particular receiver is recorded. These time intervals are combined to provide an indication of acoustic velocity of formations adjacent the logging tool. In such a system, the influence of variations on the acoustic velocity measurement caused by the borehole medium as the acoustic pulses travel to and from the borehole tool is eliminated so that the measurements are dependent solely upon the character of the subsurface formations surrounding the borehole.

SUMMARY OF THE INVENTION

The present invention is directed to a method and system for controlling the recording of logging signals from a borehole logging tool being moved through a borehole traversing subterranean formations.

In accordance with such invention, there is provided a borehole logging tool, a depth encoder for providing a select number of pulses per foot of movement of the logging tool through the borehole, a moving recording medium, and a recording encoder for providing a first signal representative of the actual rate of movement of the recording medium. The depth pulses from the depth encoder are converted to a second signal representing a desired rate of movement of the recording medium relative to the rate of movement of the logging tool. Such first and second signals are compared and a control signal is provided for increasing the speed of the recording medium when the comparison indicates that the actual rate of movement of the recording medium is lagging the desired rate, and decreasing the speed of the recording medium when the comparison indicates that the actual rate of movement of the recording medium is leading the desired rate.

DESCRIPTION OF THE PREFERRED EMBODIMENT

Figure 1:
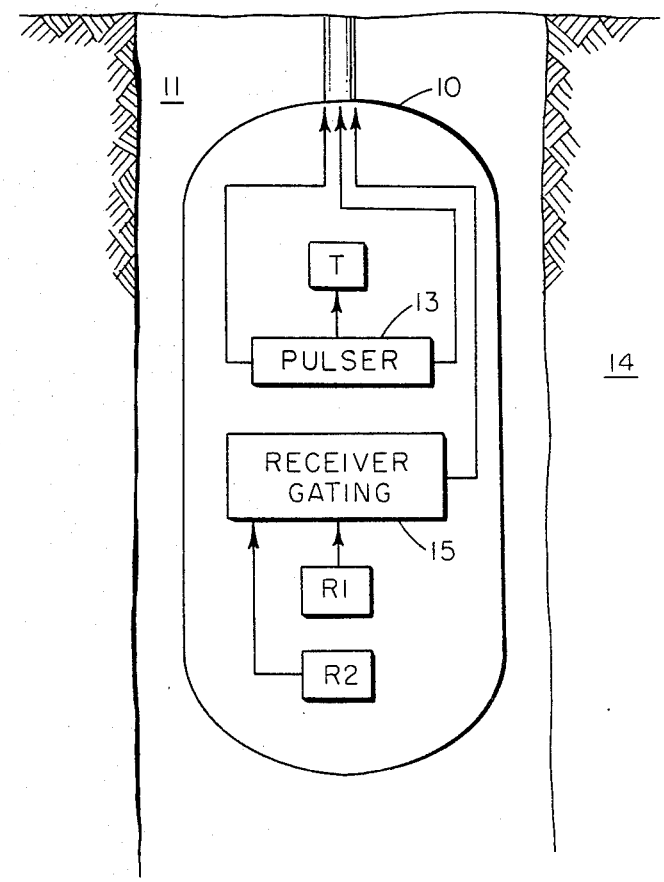
FIG. 1 illustrates a borehole logging tool with which the recording system of the present invention may be utilized.

Referring to FIG. 1, there is shown a borehole logging tool 10 suspended within the borehole 11 by means of logging cable 12. Tool 10 includes a transmitter T and two receivers R1 and R2. A pulser circuit 13 energizes transmitter T to transmit high-frequency acoustic pulses into the surrounding earth formation 14. For each acoustic cycle the pulser 13 sends a transmitter trigger pulse uphole by way of the cable 12. The acoustic pulses are detected by receivers R1 and R2. During the first acoustic cycle, the receiver gating circuit 15 sends the detected signal from receiver R1 uphole by way of cable 12. During the next acoustic cycle, the receiver gating circuit 15 sends the detected signal from receiver R2 uphole by way of cable 12. These cycles are repeated, with successive acoustic pulses being detected by the two receivers and the receiver outputs being selectively gated for sending the detected pulses uphole. The receiver gating circuit 15 also sends a receiver select signal uphole by way of cable 12, indicating which receiver output is being gated at any given time. Driven by the logging cable 12 is a depth converter including a sheave 21a and a shaft encoder 21b that converts the mechanical rotation of the sheave to depth pulses. These depth pulses are recorded by the record system 20 along with the transmitter trigger pulses, receiver signals, and receiver select signals. For a more detailed description and operation of such a borehole logging tool, reference may be made to the aforementioned U.S. Pat. No. 3,302,166 to Joseph Zemanek, Jr.

Figure 2:
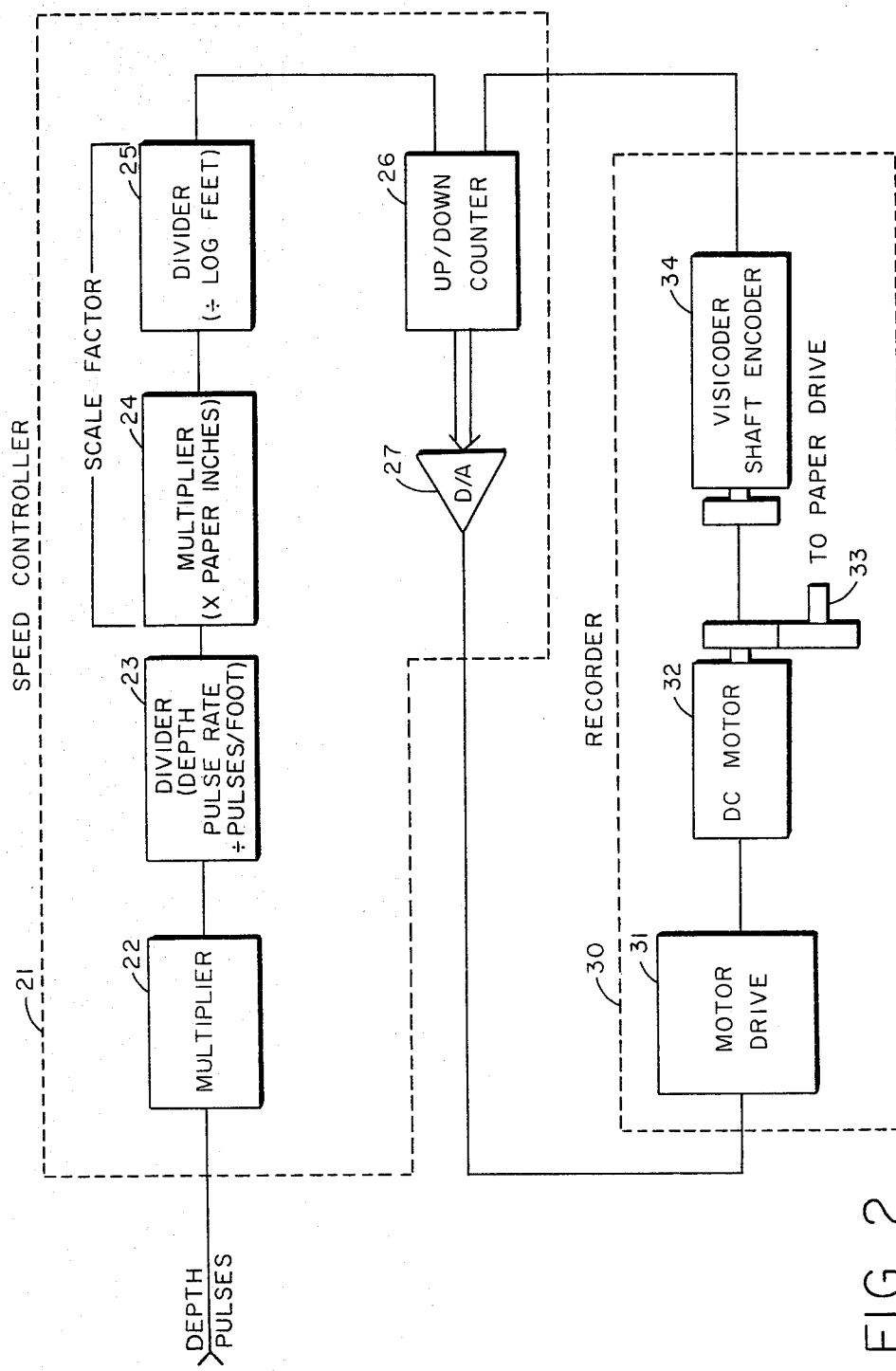
FIG. 2 is a block diagram of the recording system of the present invention.

Referring now to FIG. 2, there is illustrated the recording system of the present invention for recording the acoustic velocity logging signals from the borehole logging tool 10 of FIG. 1 in accordance with the depth of such a tool within the borehole. The recorder 30 makes a permanent record of the acoustic velocity logging signals and is driven at a speed proportional to the movement of the logging tool 10 by means of the speed controller 21.

In one embodiment, the recorder is a Honeywell model 1856 Visicorder. Such recorder is a single channel instrument which records a data signal on light sensitive direct print paper which moves past a cathode ray tube. The light energy from the cathode ray tube is coupled to the paper by a matrix of optical fibers. The fiber optics face plate transmits the light beam from the inner phosphor coating of the cathode ray tube to the polished outer surface with negligible diffusion. This permits a sharp image to be exposed on the recording paper which moves in close contact with the face of the optical fibers.

Regulation of the paper speed of the Visicorder is by way of the speed controller 21, which controls such paper speed in proportion to the speed that the logging tool 10 is being pulled up the borehole 11. Speed controller 21 provides controls to compensate for the number of depth pulses per foot of logging since this number may vary when using different shaft encoders 21b. A scale factor control is provided so that a given of logged feet is proportional to a given number of inches of recording paper. Such control of recorder 30 will now be described in conjunction with the operation of units 22-27 of the speed controller 21.

Depth pulses to the speed controller 21 are first applied to a multiplier 22 which generates a burst of pulses for each depth pulse. The number of pulses in each burst is a function of gear ratios, pinch roller, dimensions, pulses per revolution from the Visicorder shaft encoder, and units conversion from feet to inches.

The stream of pulses from multiplier 22 is applied to divider 23 where it is divided by the number of pulses per foot of logged borehole. The output of divider 23 is applied to multiplier 25 where it is multiplied by the number of inches of paper to be expelled. The output of multiplier 24 is applied to divider 25 where it is divided by the number of feet logged in the borehole. The resulting pulse stream is then applied to up/down counter 26 and D/A converter 27. An up count of pulses by counter 26 causes the D/A converter 27 output to become more positive, thereby increasing the speed of the recorder 20. This is accomplished by an increase in the speed of DC motor 32 through the motor driver 31. Conversely, a down count of pulses by the counter 26 causes the D/A converter 27 output to become more negative, thereby decreasing the speed of the DC motor 32 of recorder 30. Motor 32 is coupled to a paper drive mechanism 33 and to a shaft encoder 34. The shaft encoder 34 provides for a plurality of pulses per motor revolution, for example, 500 pulses per revolution in one embodiment. These pulses, indicating the position of the DC motor 32, are applied as a feedback to the down count input of up/down counter 26. If the paper position is lagging behind the required position, more up counts than down counts will be sensed by the up/down counter 26, thereby causing an increase in the speed of motor 32 so as to advance the paper drive 33 forward. If the paper position has advanced ahead of the required position, more down counts than up counts will be sensed by the up/down counter 26, thereby causing a decrease in the speed of motor 32 so as to advance the paper drive 33 at a slower rate. In this manner the position of the paper is regulated such that there is no cumulative error in paper position.

Figure 3:
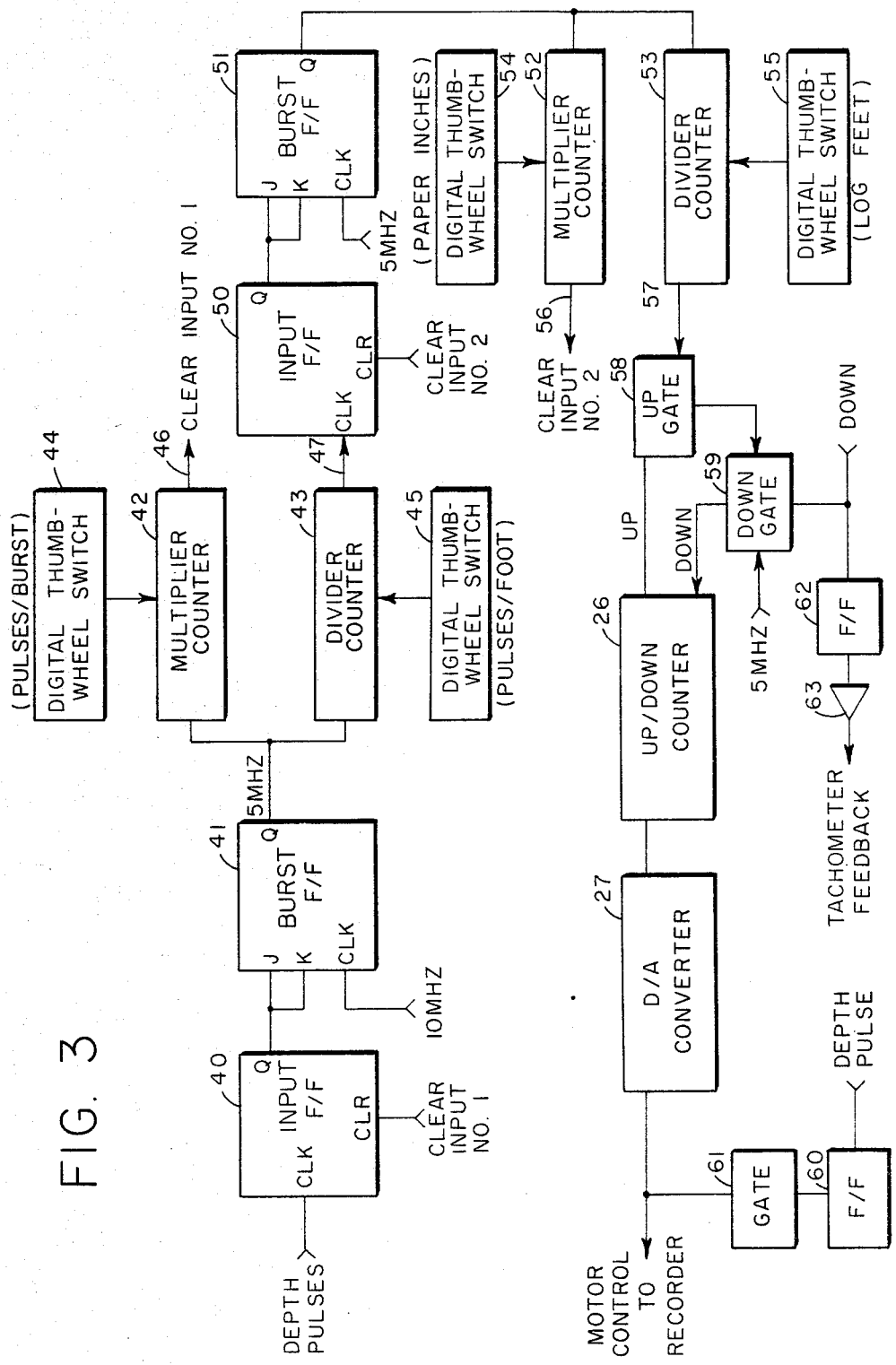
FIG. 3 is an electrical schematic of a portion of the block diagram of FIG. 2.

Referring now to FIG. 3, there will be described in more detail the operation of the circuitry of units 22-27 of speed controller 21. Depth pulses from the borehole logging tool 10 are applied to the CLK terminal of input flip-flop 40 of multiplier 21 as shown in FIG. 3.

When a depth pulse is received, the Q output of input flip-flop 40 goes high. This causes the J and K terminals of burst flip-flop 41 to go high. As a result, the clock input, 10 MHz for example, is divided by 2. Accordingly, the Q output of input flip-flop 40 would be 5 MHz. This 5 MHz clock is applied to counters 42 and 43. Counter 42 is preset by the digital thumbwheel switch 44 to the desired number of pulses per burst. The 5 MHz clock pulses are counted down within counter 42 to zero. The pulse train has now become a burst of pulses equal to the setting of the digital thumbwheel switch 44. In other words, each depth pulse has been multiplied by the number set in switch 44. This multiplication is a proportionality constant taking into account the gear ratios of the paper moving mechanism of recorder 30. Counter 42 provides a CLEAR INPUT signal on line 46 which clears input flip-flop 40 and resets it for receipt of the next succeeding depth pulse.

The 5 MHz clock is also divided by the predetermined number of pulses per foot as set by the digital thumbwheel switch 45. Counter 43 counts down these clock pulses to zero from the preset number, at which time it outputs a pulse on line 47 which represents the depth pulse multiplied by the desired number of pulses per burst and divided by the desired number of pulses per foot. This output is applied to flip-flops 50 and 51, counters 52 and 53, and switches 54 and 55 which operate in the same manner as described for units 40-45 to provide an output on line 57 representative of the depth pulse further multiplied by the desired paper inches and divided by the number of log feet. This output is the UP input signal to the up/down counter 26.

Since an UP pulse from speed controller 21 and a DOWN pulse from the recorder 30 may occur coincidentally, the gates 58 and 59 are provided so that the up/down counter 27 is not simultaneously pulsed by both pulses. If the UP pulse arrives at gate 58 first, gate 58 will lock out the DOWN pulse by disabling gate 59. Once the counter 27 has been stepped by the UP pulse, gate 59 is enabled and the counter 27 is stepped by the DOWN pulse. Since an UP pulse can occur only when the 5 MHz clock goes low, the 5 MHz clock is used to enable gate 59 when it goes high.

The D/A converter 27 converts the count signal from counter 26 to a DC voltage for control of the motor speed of recorder 30 when the depth impulses are being received from the borehole logging tool. However, when no depth pulses are present, motor control is provided by way of flip-flop 60 and gate 61. The lack of a depth pulse for one-half second, for example, sets flip-flop 60 which energizes gate 61 to provide a constant motor control current to recorder 30.

The DOWN pulse from the shaft encoder 34 of recorder 30 is also applied to multivibrator 62 and integrator 63. Multivibrator 62 is a one-shot multivibrator that provides a constant width pulse generated in response to the square wave DOWN pulse. This constant width pulse is integrated by integrator 63 to provide a DC voltage signal proportional to motor speed. This signal is fed back to the recorder as a tachometer feedback signal to provide short term stability. If only the D/A converter signal were provided, jerky operation of the motor would result. The tachometer feedback results in a smoothing of the paper advancement in the recorder 30.

Having now described the motor speed controller of the present invention in conjunction with the circuitry of FIGS. 2-3, it is to be understood that such circuitry is merely representative of one embodiment. In accordance with such embodiment, the following sets forth specific types of circuit components.

| Reference Designation | Description |
|---|---|
| Recorder 30 | Honeywell 1856 Visicorder |
| Flip-flops 40, 41, 50, 51 | 74107 |
| Switches 44, 45, 54, 57 | Amp. 53919 |
| Counters 42, 43, 52, 53 | 74LS190 |
| Gate 58, 59 | 74LS00 |
| Counter 26 | 74LS193 |
| D/A Converter 27 | Datel DAC-08BC |
| Multivibrator 60, 62 | 4096 |
| Gate 61 | 2N 3906 |
| Integrator 63 | TL084 |

It should be understood that the foregoing description relates to only a preferred embodiment of the invention and that modification or alterations may be made without departing from the spirit and scope of the invention as set forth in the appended claims.

What is claimed is:

1. A method for recording logging signals from a borehole logging tool being moved through a borehole traversing subterranean formations, comprising the steps of:
   (a) recording said logging signals on a moving recording medium,
   (b) driving said recording medium such that the logging signals produced for a select rate of movement of the logging tool in the borehole are recorded at a select rate of movement of said recording medium, the driving of said recording medium comprising increasing the rate of movement of said recording medium when said rate has decreased relative to the rate of movement of said borehole logging tool, and decreasing the rate of movement of said recording medium when said rate has increased relative to the rate of movement of said borehole logging tool,
   (c) determining a proportionality for the rates of movement of said logging tool and said recording medium, and
   (d) changing the rate of movement of said recording medium in response to changes in said proportionality.

2. The method of claim 1 wherein the driving of said recording medium comprises the steps of:
   (a) determining the actual rate of movement of said recording medium,
   (b) comparing said actual rate of movement with the select rate of movement of said recording medium,
   (c) adjusting said actual rate of movement of said recording medium when there is a variance between said actual and said select rates of movement of said recording medium.

3. A borehole logging system comprising:
   (a) a borehole logging tool,
   (b) a moving recording medium for recording the logging signals from said logging tool,
   (c) a depth encoder for providing a select number of pulses per foot of movement of said logging tool through a borehole,
   (d) means for converting said depth pulses to a first signal representative of a select rate of movement of said recording medium relative to the rate of movement of said logging tool,
   (e) a recording medium encoder for providing a second signal representative of the actual rate of movement of said recording medium, and
   (f) means for comparing said first and second signals and for providing a control signal to said recording medium for
      (i) increasing the speed of said recording medium when said comparison indicates that the actual rate of movement of said recording medium is logging the select rate, and
      (ii) decreasing the speed of said recording medium when saidd comparison indicates that the actual rate of movement of said recording medium is leading the select rate, said converting means comprising means for providing a third signal representing a select amount of movement of said logging tool, means for providing a fourth signal representative of a select amount of movement of said recording medium in relation to said select amount of movement of said logging tool, and means for modifying said depth pulses with said third and fourth signals to provide said first signal representative of a select rate of movement of said recording medium.

4. The borehole logging system of claim 3 wherein said modifying means comprises:
   (a) means for multiplying said depth pulses with said third signal, and
   (b) means for dividing said depth pulses with said fourth signal.

* * * * *